United States Patent [19]
Carlson

[11] Patent Number: 5,895,320
[45] Date of Patent: Apr. 20, 1999

[54] DEFOLIATING FLAIL

[76] Inventor: Gary G. Carlson, 15605 Lexington Ave. NE., Anoka, Minn. 55304

[21] Appl. No.: 08/839,257

[22] Filed: Apr. 17, 1997

[51] Int. Cl.$^6$ .................................................. A01D 50/00
[52] U.S. Cl. ...................... 460/121; 460/113; 56/121.43; 56/503; 56/504
[58] Field of Search ..................... 460/121, 113, 460/122, 34; 56/503, 504, 505, 233, 234, 330, 331, DIG. 19, 121.4, 121.41, 121.42, 121.43, 121.44, 121.45, 121.46

[56] References Cited

U.S. PATENT DOCUMENTS 4,291,524  9/1981  Gates ................................. 56/121.43
4,691,506  9/1987  Schwitters ........................... 56/504 X
4,691,507  9/1987  Schwitters ........................... 56/504 X
5,660,034  8/1997  Gates et al. ......................... 56/121.4 X

*Primary Examiner*—Terry Lee Melius
*Attorney, Agent, or Firm*—D. L. Tschida

[57] ABSTRACT

A polyurethane sugar beet flail including one or more tapered arms which radiate from a hub that contains a hardened support bearing. One multi-arm flail includes a support hub containing a bored nylon bearing having a pair of co-planar arms which radiate from a tapered transition region of the hub. A channel separates the arms. Another multi-arm flail includes a pair of arms staggered about the circumference of the hub. Another flail provides a single arm.

13 Claims, 9 Drawing Sheets

DEFOLIATING FLAIL

BACKGROUND OF THE INVENTION

The present invention relates to agricultural flail choppers and, in particular, to single and multi-arm polyurethane defoliating flails for removing leaves and other above-grade foliage and roughage, prior to harvesting below grade tubers, such as sugar beets or potatoes.

Flail choppers are well known in the agricultural industry and are used in a variety of different applications. Many flails are used to harvest sugar beets and potatoes. The flails or knives are typically constructed from metal and exhibit a variety of shapes and sharpened edges. Some metal flails are mounted to lengths of chain. A bored mounting plate typically secures the foregoing flails to a rotating drum or arm. U.S. Pat. Des. Nos. 340,247 and 5,249,751 disclose two rigid metal flails.

Examples of two flexible, polyurethane flails are shown at U.S. Pat. Nos. 4,691,506 and 4,691,507. The latter flails include metal fingers and metal studs which are formed into the ends of the flails.

Conventional flails provide a single arm which extends from a mounting end, for example, a mounting plate or a tubular bore. Polyurethane flails and other known rubber flails merely provide a molded end having a transverse extending bore. Durability, thus depends upon the material, since wear occurs not only at the foliage striking end, but also at the mounting bore.

In various sugar beet harvesters, multiple flails are arrayed about the circumference of a supporting drum. The flails mount to a number of spokes or rods, which laterally extend between the ends of the drum. Each rod contains a number of laterally displaced flails, which pivot as the drum is rotated and shred encountered foliage. Different sizes and types of flails are frequently mounted at the drums. Spacers may be positioned between the flails as desired by the farmer and the crop being harvested. The vertical separation of the flails to the tuber being harvested and/or the ground is adjusted as necessary to optimize contact with the foliage, without damaging the tuber and preferably without contacting the ground.

The present invention discloses an improved resilient flail. In alternative, single and multi-arm constructions, the resilient arms radiate from a mounting hub containing a nylon bearing or rigid support bushing that is molded into the hub. The durometer of the arms is established to permit the arms to flex and conform to encountered foliage. The arms radially extend in coplanar, parallel relation or are radially offset.

SUMMARY OF THE INVENTION

It is a primary object of the invention to provide a resilient, elastomer flail which flexes to optimize contact with encountered foliage.

It is a further object of the invention to provide a flail having one or more molded arms that extend from a hub which includes a hardened support bearing cast into the hub.

It is a further object of the invention to provide a flail having multiple arms that radiate from a hub.

It is a further object of the invention to provide a flail having multiple arms that radiate from a hub in adjacent coplanar registry and which hub contains a hardened support bearing.

It is a further object of the invention to provide a flail having multiple arms that radiate in displaced, staggered registry to one another from the mounting hub.

Various of the foregoing objects, advantages and distinctions of the invention are obtained in a number of flail constructions. In one construction, a pair of adjacent arms radiate from a single transition region of a support hub cast about a cylindrical sleeve bearing molded from a hardened nylon. The arms are separated by a channel. Elastomer studs project from the arms.

In another construction, a pair of arms radiate from the support hub at displaced, tapered transition regions in a staggered registry to one another. The width of all or a portion of the arms can be molded to overlap one another.

A single arm having elastomer studs is also disclosed. The arm radiates from a tapered transition region of a hub containing a hardened bearing.

Still other objects, advantages and distinctions of the invention, as well as other constructions are more apparent at the following description with respect to the appended drawings. Similar structure appearing at the drawings is identified with similar reference characters or numerals. Various considered modifications and improvements are described as appropriate.

The scope of the invention should not be literally construed nor limited by the disclosed constructions. Rather, the invention should be interpreted to include all those equivalent constructions within the scope of the further appended claims.

DESCRIPTION OF THE PREFERRED EMBODIMENT

Figure 1:
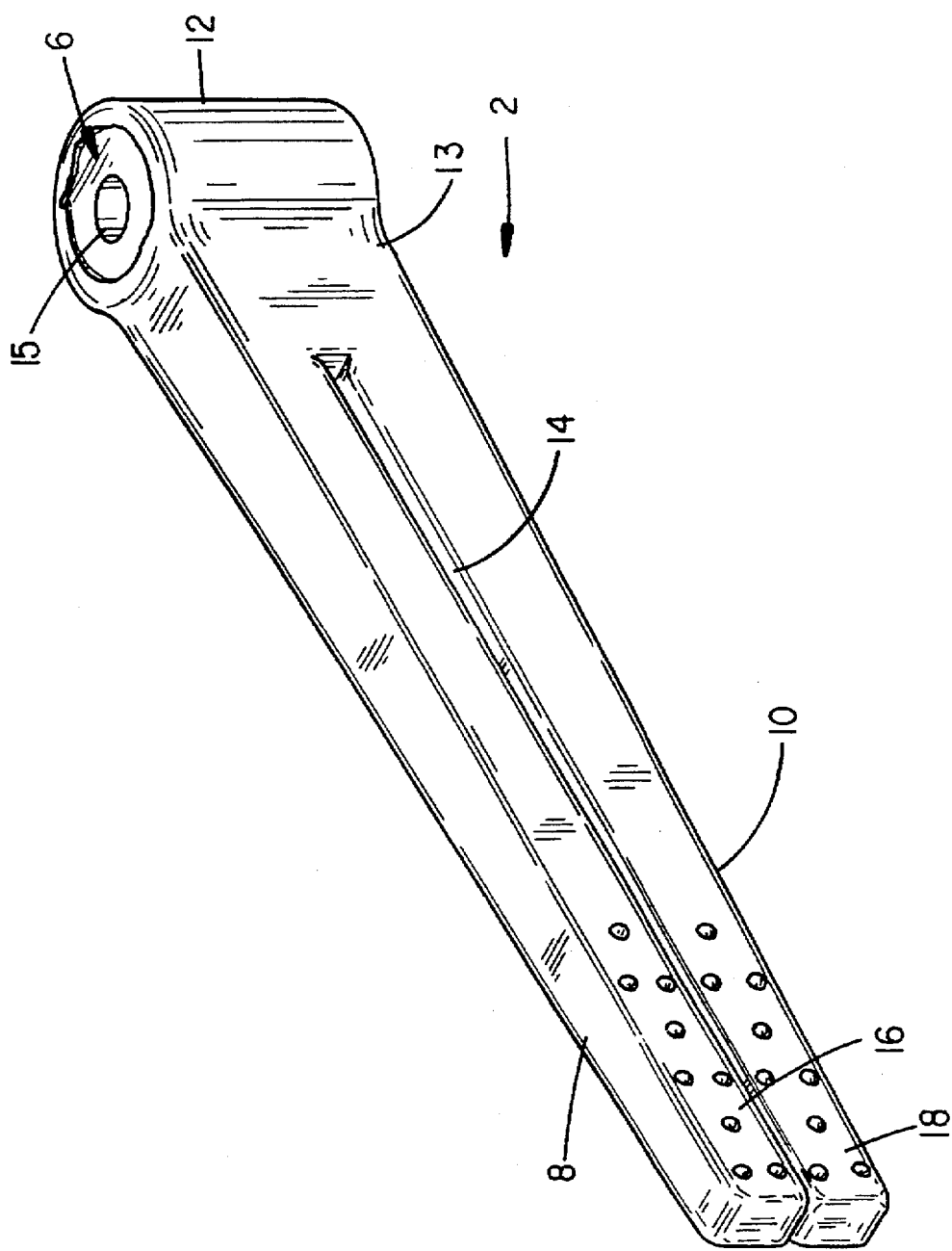
FIG. 1 is a perspective drawing showing a two arm defoliating flail.

With attention to FIGS. 1 through 6, views are shown to a multi-arm elastomer flail 2. The flail 2 is constructed to provide a hardened sleeve bearing or bushing 6 and at which the flail 2 is secured to a harvester (not shown). A pair of arms 8 and 10 radiate along a common radial axis from the side wall of a molded hub 12 which contains the bearing 6 and an intervening, tapered transition region 13. A longitudinal gap slot or channel 14 separates the arms 8 and 10 as they extend from the transition region 13. The apex of the slot 14 begins at the outer end of the transition region 13 and divides the arms 8 and 10 over their lengths. A bore 15 extends through the bushing 6 and is exposed at the end walls of the hub 12.

The transition region 13 provides a bi-directional taper, i.e. vertically and laterally, to reduce the thickness of the arms 8 and 10 relative to the hub 12. The tapering at the transition region 13 permits the hubs 12 of a number of flails 2 to be mounted in adjacent contact with one another at a harvester defoliator drum. The arms 8 and 10 can also be vertically relieved from the ends of the bearing 6. Spacers (not shown) can be included between the flails 2 or other types of conventional flails can be combined and interspersed with the flails 2 and spacers.

Figure 3:
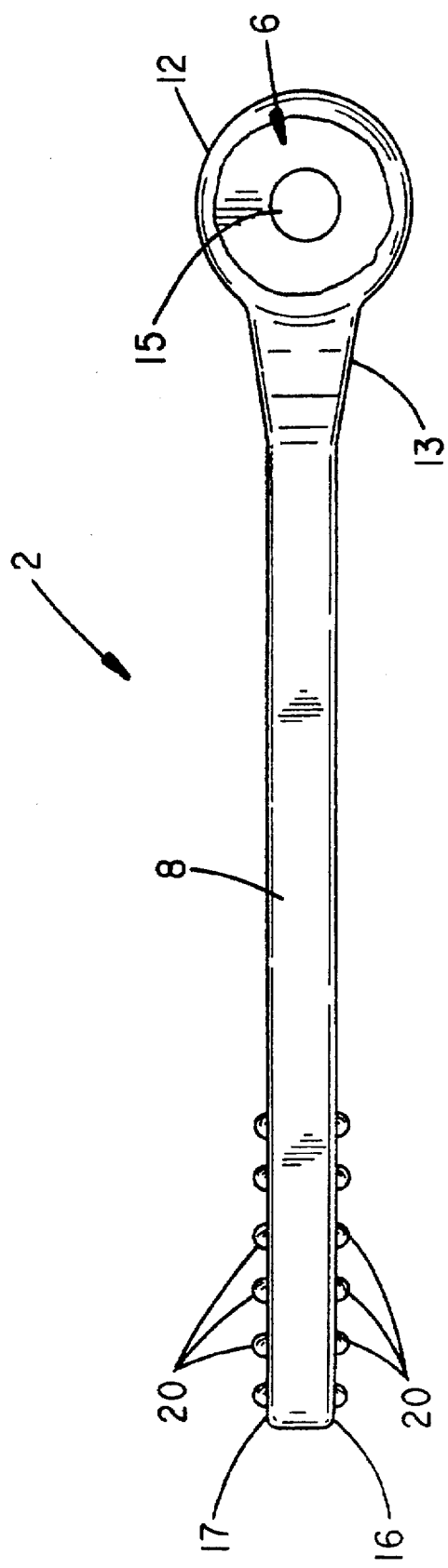
FIG. 3 is a top plan view of the flail of FIG. 1.
Figure 4:
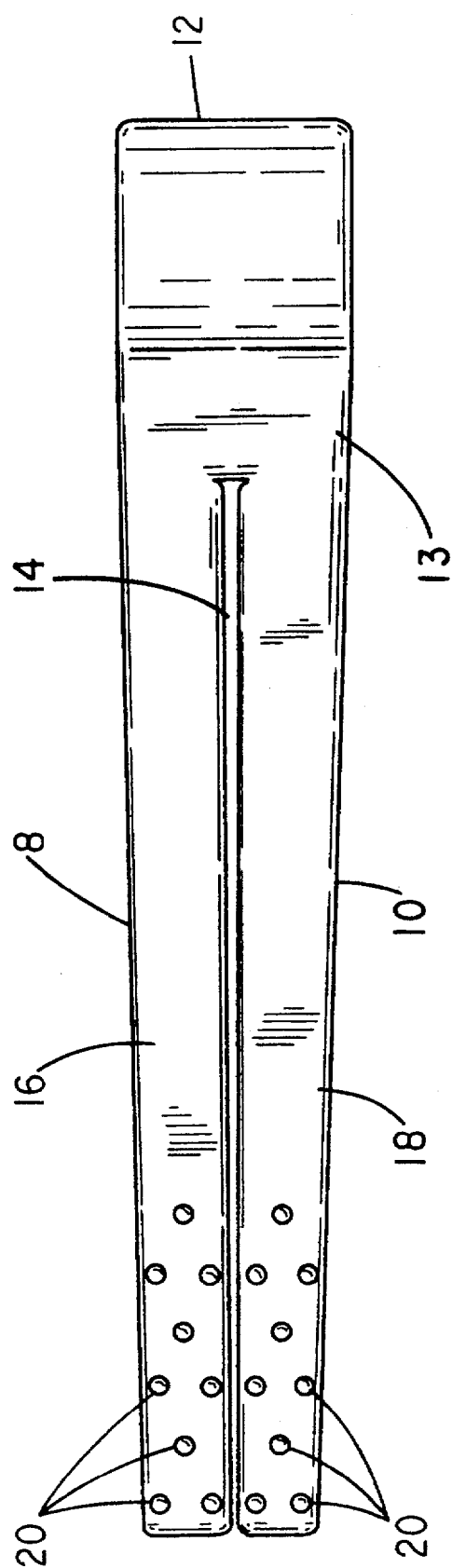
FIG. 4 is a front plan view of the flail of FIG. 1.
Figure 6:
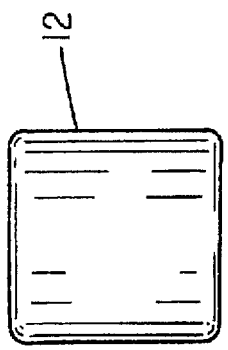
FIG. 6 is a right side elevation view of the flail of FIG. 1.
Figure 5:
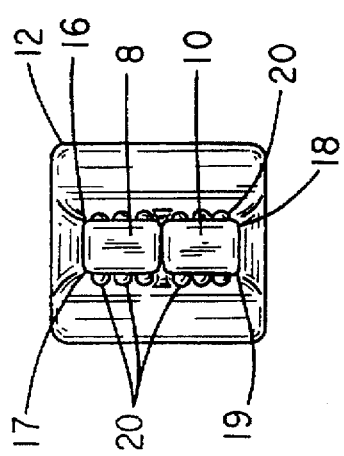
FIG. 5 is a left side elevation view of the flail of FIG. 1.

The arms 8 and 10 extend with a uniform cross sectional profile over their lengths, reference FIGS. 3 and 5. The arms 8 and 10 are molded with a square profile and the outer ends of the arms 8 and 10 are substantially thinner than the diameter of the hub 12. Depending upon the ingredient mixture and materials from which the flail 2 is molded, some shrinkage can occur during curing, which can effect the shape of the arms 8, 10 and channel 14.

The construction of the arms 8 and 10 is such that the arms 8 and 10 individually flex and conform about encountered foliage. An increased surface area of the encountered foliage is thereby contacted to better shred the foliage without leaving standing residue. Harvesting with conventional metal or polyurethane arms can produce gaps and standing residue, where the foliage has bent or moved to avoid contact with the flails.

The arms 8 and 10 and hub 12 are molded as an integral structure about the bearing 6 using conventional insert molding techniques. The durometer of the elastomer material used to mold the flail 2 is tailored to provide a desired flexion, yet exhibit sufficient rigidity and durability to any encountered dirt, rocks and the like to extend the useful life of the flail 2. A typical mixture used in the flails 2 can comprise on the order of 80% polyurethane, 5% re-ground rubber, 13% polycarbonate and 2% of a cross-linking, chemical bonding agent. The mixture can be adjusted plus or minus 10. Other ingredients might also be added to facilitate molding and strength. Conventional molding techniques are used to mold the flails 2.

A durometer on the order of 80 as measured on the "Shore A" scale, plus or minus 5 points, is exhibited by the flail 2. A demonstrated wear characteristics and useable life on the order of 1000 acres is thereby obtained, before it is necessary to replace the flails 2. The wear characteristic of a flail 2 can vary with the type of soil and harvesting conditions.

Figure 2:
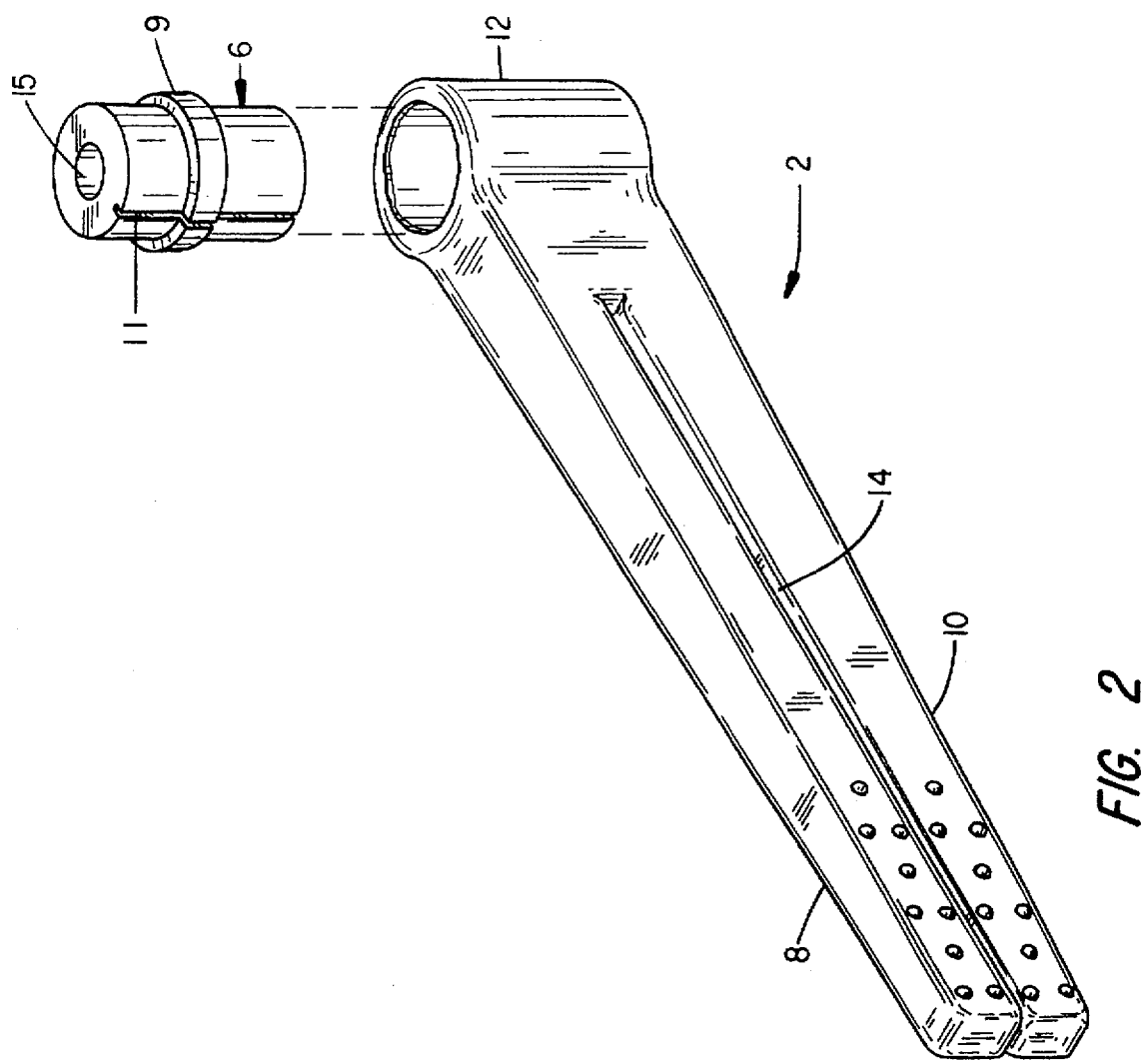
FIG. 2 is a perspective drawing shown in exploded assembly to the two arm defoliating flail of FIG. 1.

The bearing 6 is formed from a nylon material and provides a ⅝ inch bore 15 that is sized to mount to a support rod of a defoliator drum. A vertical slot 11 and annular flange 9, reference FIG. 2, are provided to align the bearing 6 to the mold and permit the elastomer melt material to flow about and bond to the bearing 6. The hub 12 exhibits a nominal height of 2 inches and a diameter of 2¼ inches. The arms 8 and 10 extend approximately 10 inches and are separated at the slot 14 by a nominal ¼ inch. Each arm 8 and 10 exhibits a nominal cross sectional height selected in the range of ½ to ¾ inches and a thickness of ½ to ¾ inches. The arms 8 and 10 of the flail 2 exhibit a uniform ⅝ inch square cross sectional profile over their lengths, reference FIG. 5.

The arms 8 and 10 can be molded to exhibit a variety of other cross sectional profiles. The relative sizes of the hub 12 and the arms 8 and 10 can also be varied depending upon the degree of desired flexibility, taper and wear characteristic. The hub 12 can also be constructed to a non-circular shape and may exhibit facets from which each transition region 13 and arm 8 or 10 radiates. Although two arms 8 and 10 are shown, which radiate in co-planar registry, additional arms might also radiate from the hub 12. The arms 8 and 10 might also radiate in various relationships to one another, for example, the radially staggered relationship shown at FIG. 7, which is discussed below.

Projecting from striking surfaces 16, 17 and 18, 19 at the opposite sides of the ends of the arms 8 and 10 are a number of integrally molded polyurethane studs 20. Identical, repeating patterns of studs 20 are provided at each of the arms 8 and 10. The studs 20 facilitate gripping and contact by the arms 8 and 10 with encountered foliage to enhance plant reduction. The molding of the studs 20 from the flail material also avoids the necessity of fitting separate studs to the arms 8 and 10. A variety of different stud patterns can be provided at the surfaces 16, 17 and 18, 19. The studs 20 can project at the same or differing heights. The studs 20 can also be entirely deleted from one or both of the arms 8 and 10. Studs 20 constructed from a variety of other materials, such as hardened metals, nylon etc. can also be molded or fitted to the arms 8 and 10 to enhance gripping and durability.

Figure 7:
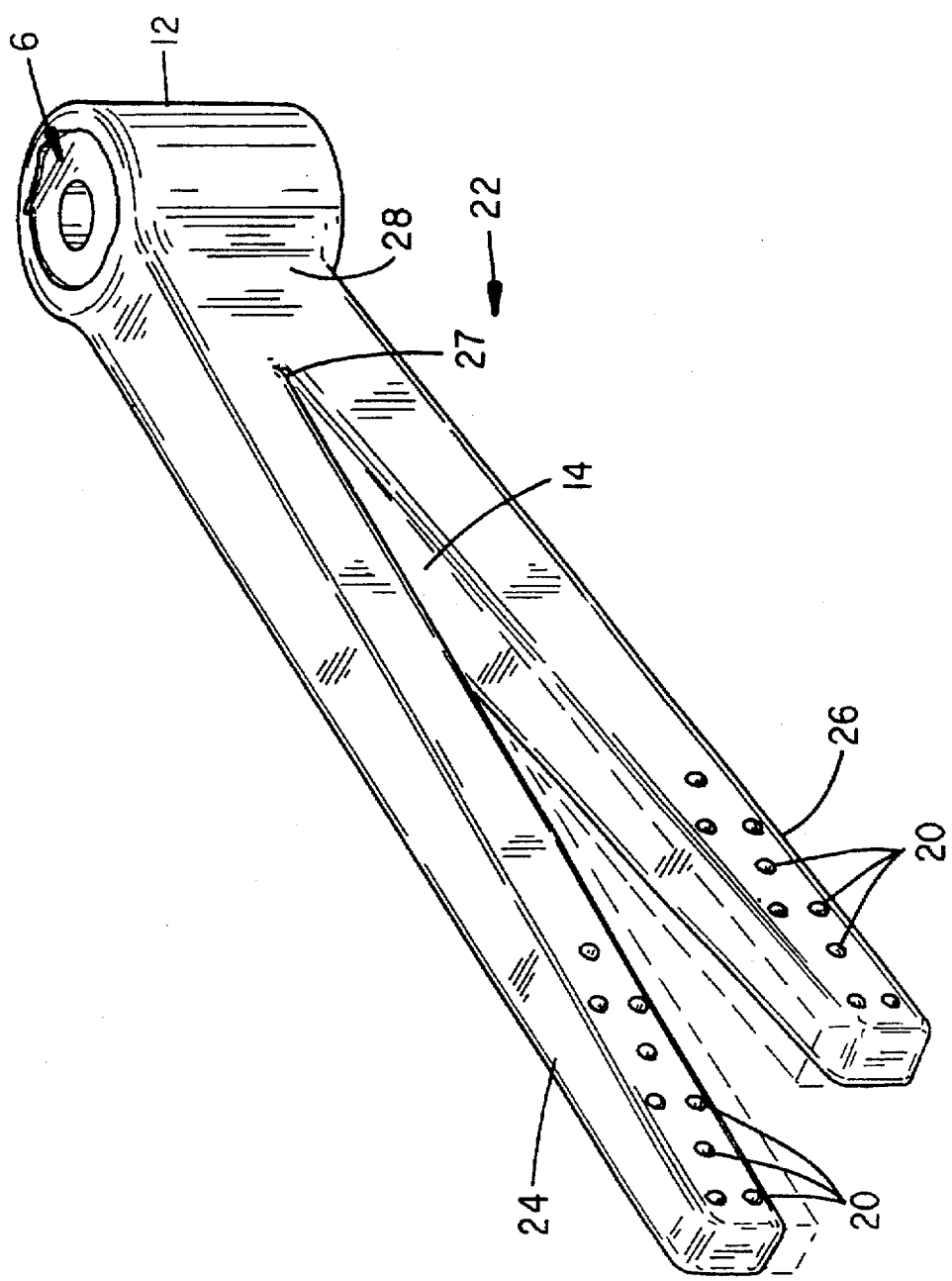
FIG. 7 is a perspective drawing of an alternative two arm defoliating flail having radially staggered arms and wherein a further alternative construction having overlapping arms is shown in dashed line.
Figure 8:
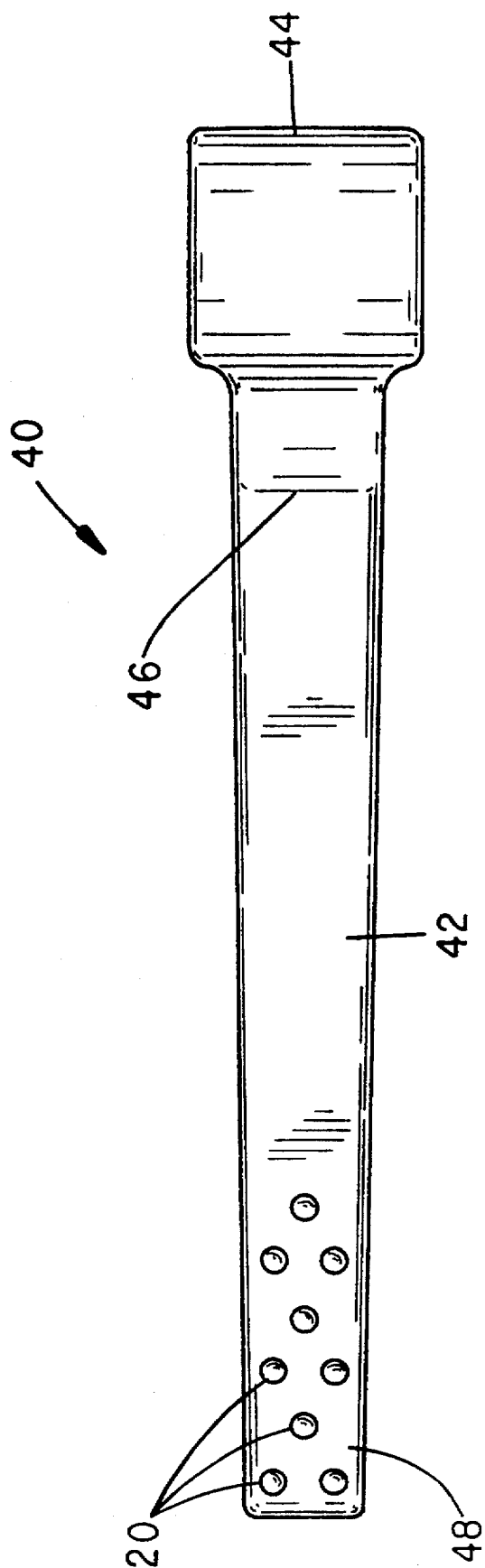
FIG. 8 is a front plan view of a single arm flail having an insert molded, hardened, support bearing.
Figure 9:
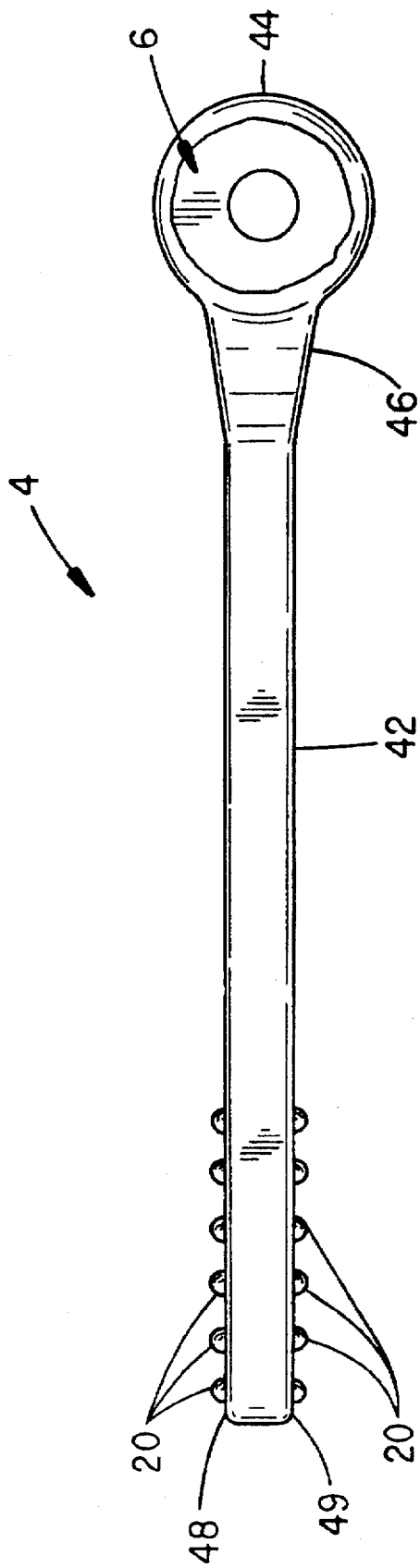
FIG. 9 is a top plan view of the flail of FIG. 8.
Figure 11:
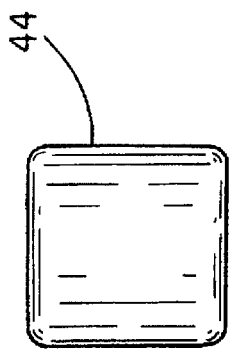
FIG. 11 is a right side elevation view of the flail of FIG. 8.
Figure 10:
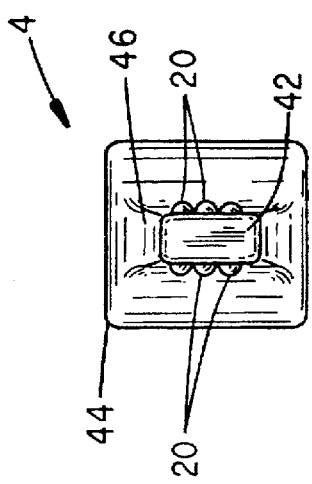
FIG. 10 is a left side elevation view of the flail of FIG. 8.

FIG. 7 depicts an alternative multi-arm flail 22 having a pair of arms 24 and 26. The arms 24 and 26 are radially staggered when viewed from the top of the hub 12. The arms 24 and 26 can be separated in the range of 5 to 20 degrees from each other. The arms 24 and 26 extend from a single tapered transition region 28, although each can extend from a separate transition region. A number of integral studs 20 project from the arms 24 and 26.

The arms 24 and 26 do not overlap and extend with a vertical separation or gap 27. The staggering of the arms 24 and 26, however, permits the arms 24 and 26 to be molded with differing vertical heights. In this instance, the vertical height of the arms 24 and 26 can be molded to overlap one another in the region of the gap 27, such as shown in dashed line. The overlap can extend the entire length of the arms 24 and 26 or only over a portion of one or both arms 24 and 26. An overlap assures that gaps do not occur in foliage reduction, such as if the arms 24 and 26 splay outward or twist at the gap 27 and the foliage is not contacted by a following flail 22 at the harvester. The staggering and overlapping or the arms 24 and 26 assures that the following arm immediately contacts the foliage, before the foliage springs away from the next flail of a succeeding row of flails at the drum.

With attention to FIGS. 8 through 11, a single arm flail 40 is shown which is molded about a hardened bearing 6. The flail 40 provides a single arm 42 which extends from a homogeneously molded hub 44. The arm 42 is recessed inward at a tapered transition region 46 from the hub 44 and extends with a uniform cross sectional profile over the length of the arm 42. The thickness and height of the arm 42 is reduced by the tapers established at the transition region 46 to provide a desirable flexibility at the arm 42.

The hub 44 presently exhibits the same nominal dimensions as the hub 12. The arm 42 exhibits a nominal vertical height of 1 inch and a ⅝ inch thickness.

Molded studs 20 project from the striking surfaces 48 and 49 on the opposite sides of the arm 42. The pattern and type of studs 30 can be varied.

While the invention has been described with respect to a number of presently considered and preferred constructions, it is to be appreciated still other constructions may be suggested to those skilled in the art upon reference hereto. The invention should therefore be construed to include all those equivalent embodiments within the spirit and scope of the following appended claims.

What is claimed is:

1. A harvesting flail comprising:

a) an elastomer hub having first and second end walls and a side wall that extends therebetween and including a bearing having a bore molded into said hub and wherein said bore is exposed at the first and second end walls; and b) first and second arms radially extending from the side wall and wherein a gap separates said first and second arms from one another.

2. A flail as set forth in claim 1 wherein said bearing is formed from a nylon and said flail is molded from a polyurethane.

3. A flail as set forth in claim 1 wherein said first and second arms each contain a plurality of molded elastomer studs.

4. A flail as set forth in claim 1 wherein said first and second arms each exhibit a rectilinear cross section over their length, wherein said first and second arms extend from a transition region that radially extends from the side wall and that substantially spans the space between the first and second end walls, and wherein said first and second arms extend along a common radial axis to said bore when viewed looking toward either of the first or second end walls.

5. A flail as set forth in claim 4 wherein said first and second arms each contain a plurality of molded elastomer studs.

6. A flail as set forth in claim 1 wherein said first and second arms extend from said hub in displaced relation to one another along different radial axes to said bore when viewed looking toward either of the first or second end walls.

7. A flail as set forth in claim 6 wherein when viewed looking toward the side wall a peripheral edge of one of said first and second arms overlaps a peripheral edge of the other of said first and second arms.

8. A flail as set forth in claim 1 wherein said first and second arms each exhibit a rectilinear cross section over their length.

9. A harvesting flail comprising:

a) an elastomer hub having first and second endwalls and a sidewall that extends therebetween and including a bearing having a bore molded into said hub and wherein said bore is exposed at the first and second end walls; and b) a transition region having a plurality of surfaces that taper inward as they radially extend from said side wall, wherein first and second arms extend from the transition region and are separated by a gap.

10. A flail as set forth in claim 9 wherein said first and second arms extend along a common radial axis to said bore when viewed looking toward either of the first or second end walls.

11. A flail as set forth in claim 9 wherein said first and second arms extend along different radial axes to said bore when viewed looking toward either of the first or second end walls.

12. A flail as set forth in claim 9 wherein said bearing includes an annular flange and a slot extends between the first and second end walls and is formed from a nylon, wherein said hub and first and second arms are molded from a polyurethane, and wherein a plurality of elastomer studs project from at least one of said first and second arms.

13. A flail as set forth in claim 9 wherein said first and second arms each exhibit a rectilinear cross section over their length, and wherein when looking to said side wall a peripheral edge of one of said first and second arms overlaps a peripheral edge of the other of said first and second arms.

* * * * *